United States Patent
Doerr

(10) Patent No.: US 6,728,446 B2
(45) Date of Patent: Apr. 27, 2004

(54) COMPACT WAVELENGTH ROUTING DEVICE HAVING SUBSTANTIALLY FLAT PASSBAND

(75) Inventor: Christopher Richard Doerr, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 81 days.

(21) Appl. No.: 10/205,642

(22) Filed: Jul. 25, 2002

(65) Prior Publication Data

US 2003/0128926 A1 Jul. 10, 2003

Related U.S. Application Data

(60) Provisional application No. 60/307,906, filed on Jul. 26, 2001.

(51) Int. Cl.[7] .................. G02B 6/26; G02B 6/34
(52) U.S. Cl. ................. 385/37; 385/24; 398/115
(58) Field of Search ................. 385/24, 31, 37, 385/39, 147; 398/100, 115

(56) References Cited

U.S. PATENT DOCUMENTS

| | | | |
|---|---|---|---|
| 5,412,744 A | 5/1995 | Dragone | 385/24 |
| 5,488,680 A | 1/1996 | Dragone | 385/24 |
| 5,915,051 A * | 6/1999 | Damask et al. | 385/16 |
| 6,266,460 B1 | 7/2001 | Doerr | 385/16 |
| 6,289,147 B1 * | 9/2001 | Bulthuis et al. | 385/24 |
| 6,421,478 B1 * | 7/2002 | Paiam | 385/24 |
| 6,587,615 B1 * | 7/2003 | Paiam | 385/24 |
| 2002/0097962 A1 * | 7/2002 | Yoshimura et al. | 385/50 |
| 2002/0122615 A1 * | 9/2002 | Painter et al. | 385/15 |
| 2003/0095736 A1 * | 5/2003 | Kish et al. | 385/14 |
| 2003/0099018 A1 * | 5/2003 | Singh et al. | 359/152 |

OTHER PUBLICATIONS

Doerr, et al., "Compact and Low–Loss Integrated Flat–Top Passband Demux," 27th European Conference on Optical Communication, ECOC v. 6, 2001, pp. 24–25, (no date).

* cited by examiner

Primary Examiner—Akm Enayet Ullah

(57) ABSTRACT

An optical apparatus includes a first wavelength routing device having a first plurality of waveguide arms and a 180° optical coupler, and a second wavelength routing device coupled to the first wavelength routing device, the second wavelength routing device having a second plurality of waveguide arms. Each of the second plurality of waveguide arms has a substantially opposite curvature relative to each of the first plurality of waveguide arms.

20 Claims, 5 Drawing Sheets

100

200

400

COMPACT WAVELENGTH ROUTING DEVICE HAVING SUBSTANTIALLY FLAT PASSBAND

CROSS-REFERENCE TO RELATED APPLICATIONS

This application claims benefit of U.S. provisional patent application Ser. No. 60/307,906, filed Jul. 26, 2001, which is incorporated herein by reference in its entirety.

BACKGROUND OF THE INVENTION

1. Field of the Invention

The present invention generally relates to optical switching components and, more particularly, to a compact wavelength routing device having a substantially flat passband.

2. Description of the Related Art

Optical wavelength division multiplexed (WDM) systems are becoming increasingly important. As the spectral efficiency of such WDM systems increases, wavelength routing devices that multiplex and demultiplex optical wavelengths require maximal passband width. A wider passband in the optical multiplexer/demultiplexer reduces the need for accurate control of the transmitted wavelengths and causes less signal distortion.

Presently, optical multiplexers and demultiplexers are realized in integrated form by using an imaging arrangement of waveguides having a constant path-length difference. Such devices are typically referred to as waveguide grating routers (WGRs). Attempts to increase or flatten the passband of WGRs have generally resulted in either lossy or large devices.

SUMMARY OF THE INVENTION

An optical apparatus comprising a first wavelength routing device having a first plurality of waveguide arms and a 180° optical coupler, and a second wavelength routing device coupled to the first wavelength routing device, the second wavelength routing device having a second plurality of waveguide arms. Each of the second plurality of waveguide arms has a substantially opposite curvature relative to each of the first plurality of waveguide arms. In one embodiment, the first wavelength routing device is a Mach-Zehnder interferometer (MZI) having first and second waveguide arms, and the second wavelength routing devices is a waveguide grating router (WGR).

The present invention can be used to provide an optical multiplexer/demultiplexer having a substantially flat passband. In addition, the present invention is compact and stackable given the opposite curvature of the waveguide arms between the first wavelength routing device and the second wavelength routing device.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention is a compact wavelength routing device having a substantially flat passband. The present invention is useful for implementing optical multiplexers and demultiplexers in wavelength division multiplexed (WDM) optical transmission systems. Those skilled in the art, however, will appreciate that the present invention has broad applications beyond the optical transmission systems described herein, and can be used in any system that requires multiplexing and demultiplexing of wavelengths of light.

Figure 1:
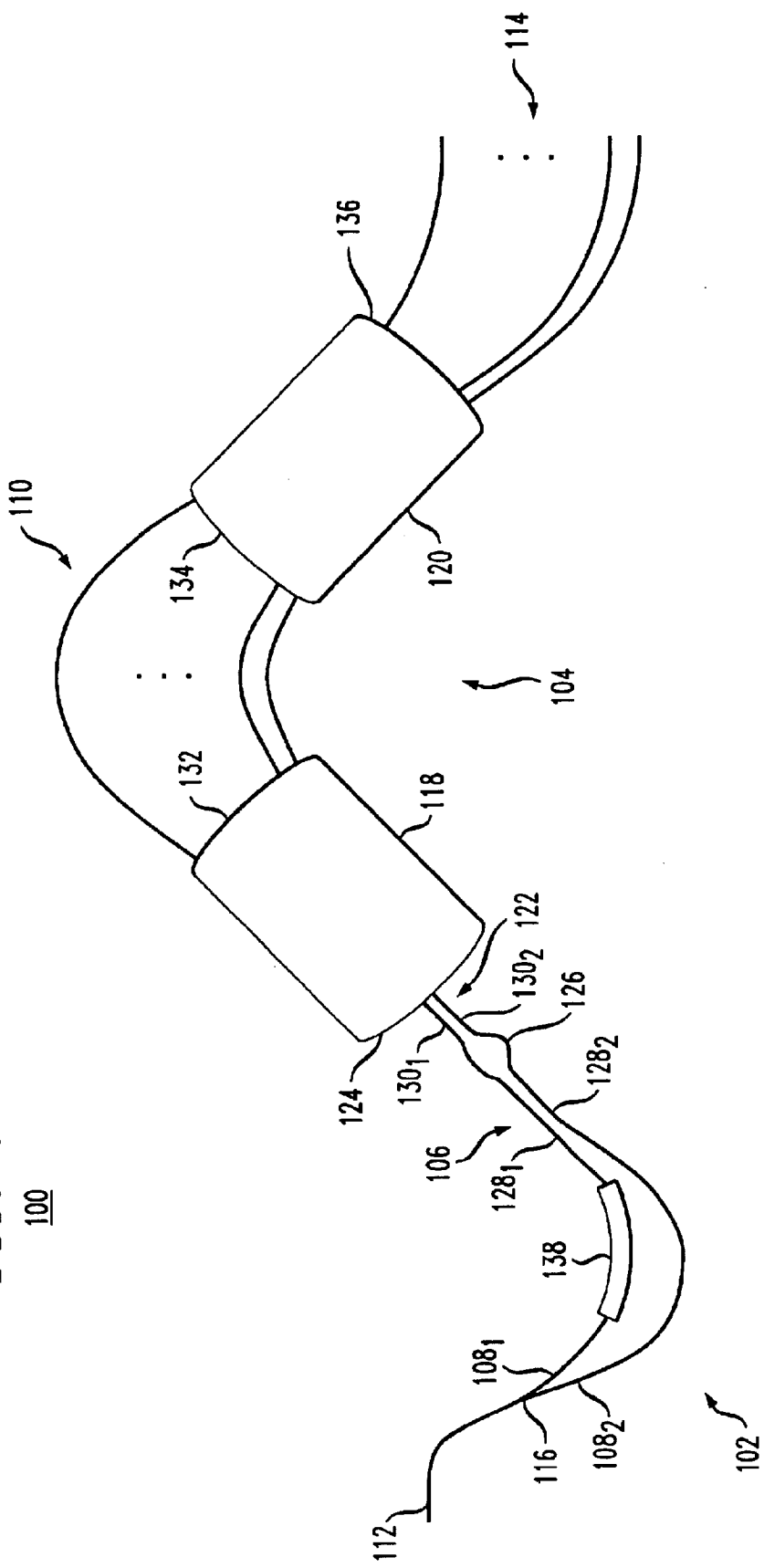
FIG. 1 depicts one embodiment of an optical multiplexer/demultiplexer device in accordance with the present invention.

FIG. 1 depicts one embodiment of an optical multiplexer/demultiplexer device 100 in accordance with the present invention. The optical multiplexer/demultiplexer 100 can be fabricated in a silica planar lightwave circuit. The optical multiplexer/demultiplexer 100 comprises an input waveguide 112, a first wavelength routing device 102, a second wavelength routing device 104, and a plurality of output waveguides 114. The input waveguide 112 is coupled to the first wavelength routing device 102, which generally comprises a plurality of waveguide arms 108 (e.g., waveguide arms $108_1$ and $108_2$). The output waveguides 114 are coupled to the second wavelength routing device 104, which also comprises a plurality of waveguide arms 110. The waveguide arms 110 of the second wavelength routing device 104 have a substantially opposite curvature relative the waveguide arms $108_1$ and $108_2$ of the first wavelength routing device 102. The "flip" in the sign of curvature between the first wavelength routing device 102 and the second wavelength routing device 104 allows for a compact and stackable device.

As shown in FIG. 1, the first wavelength routing device 102 illustratively comprises an optical coupler 116, waveguide arms $108_1$ and $108_2$, a 180° optical coupler 106, and a 90° optical coupler 122. In the present example, the waveguide arms $108_1$ and $108_2$ form a Mach-Zehnder Interferometer (MZI). The input waveguide 112 is coupled to the waveguide arms $108_1$ and $108_2$ via optical coupler 116. The optical coupler 116 divides an optical signal propagating in the input waveguide 112 among the waveguide arms $108_1$ and $108_2$. The waveguide arms $108_1$ and $108_2$ each have different physical lengths so that a phase difference arises between optical signals of equal wavelength as the signals traverse the waveguide arms $108_1$ and $108_2$. An optical phase shifter 138 is optionally disposed in one of the waveguide arms $108_1$ and $108_2$, in order to wavelength-align the resulting MZI with the second wavelength routing device 104. A wavelength misalignment typically results in a passband tilt. The optical phase shifter 138 comprises a thermooptic phase shifter, and electrooptic phase shifter, or like type optical phase shifters known in the art.

The optical coupler 116 comprises a Y-branch, a directional coupler, or any other type of 50/50 optical power splitter known in the art. The waveguide arms $108_1$ and $108_2$ are coupled to waveguide portions $128_1$ and $128_2$, respectively, of the 180° optical coupler 106. The waveguide portions $128_1$ and $128_2$ have a length and spacing selected to affect a waveguide crossing. That is, the output of waveguide portion $128_1$ is the optical signal that traversed waveguide arm $108_2$, and the output of waveguide portion $128_2$ is the optical signal that traversed waveguide arm $108_1$. The waveguide portions $128_1$ and $128_2$ are coupled to respective waveguide portions $130_1$ and $130_2$ of the 90° optical coupler 122. The 180° optical coupler 106 allows for the flip in the sign of curvature between waveguide arms 108 of the first wavelength routing device 102 and waveguide arms 110 of the second wavelength routing device 104.

The second wavelength routing device 104 illustratively comprises a WGR. The WGR 104 comprises a first free space region 118, a second free space region 120, and the plurality of waveguide arms 110. The waveguide arms 110 are configured to provide a constant amount of path length difference from arm to arm. In addition, each of the waveguide arms 110 has a curvature substantially opposite from that of the waveguide arms 108 of the first wavelength routing device 102. The 90° optical coupler 122 is coupled to the first free space region 118. In particular, waveguide portions $130_1$ and $130_2$ of the 90° optical coupler 122 are coupled to an input circle 124 of the first free space region 118. The waveguide portions $130_1$ and $130_2$ have a length and spacing to affect a substantially 50/50 optical power split therebetween. The 90° optical coupler 122 comprises a directional coupler, for example. In practice, little distinction is made between waveguide arms $108_1$ and $108_2$, waveguide portions $128_1$ and $128_2$, and waveguide portions $130_1$ and $130_2$, since these waveguides can be fabricated as integral, continuous waveguides.

The waveguide arms 110 are coupled between the output circuit 132 of the first free space region 118 and the input circle 134 of the second free space region 120. The output waveguides 114 are coupled to the output circle 136 of the second free space region 120. The first wavelength routing device 102 and the second wavelength routing device 104 are designed such that across each passband, the spot movement versus wavelength at the interface (e.g., the interface of the input circle 124 and the 90° optical coupler 122) is synchronized. That is, if there are N wavelength channels in the free spectral range of the second wavelength routing device 104, then the path-length difference between arms $108_1$ and $108_2$ is substantially N times the path length difference between adjacent arms in the plurality of waveguide arms 110.

In this illustrative embodiment, an optical phase shift 126 is formed in one waveguide path between the 180° optical coupler 106 and the 90° optical coupler 122 (i.e., between waveguide portions $128_1$ and $130_1$ or waveguide portions $128_2$ and $130_2$). The optical phase shift 126 comprises a path length difference between the waveguide paths. If the optical couplers 106 and 122 are ideal and wavelength-independent, then the phase shift between couplers 106 and 122 is not necessary. Since the optical couplers 106 and 122 are typically not ideal, a phase shift can be used to minimize the passband shape and chromatic dispersion change with optical coupler variation. The optimum phase shift $\phi$ to be produced by phase shift 126 can be determined as follows:

Suppose each coupler 106 and 122 has an error in its relative eigenmode phase shift of $\alpha/90°$ percent. Assuming $\alpha \ll 1$, then the action of the net coupler is given by:

$$\frac{1}{\sqrt{2}}\begin{bmatrix} 1-\Delta & j+j\Delta \\ j+j\Delta & 1-\Delta \end{bmatrix}\begin{bmatrix} 1 & 0 \\ 0 & e^{j\phi} \end{bmatrix}\begin{bmatrix} -2\Delta & j \\ j & -2\Delta \end{bmatrix}\begin{bmatrix} 1 & 0 \\ 0 & e^{j\phi} \end{bmatrix}$$

where a phase shift $\phi$ is added in front of one of the paths to undo the second phase shift produced by the couplers 106 and 122. For phase shifts $\phi=0°$, $\phi=120°$, and $\phi=180°$, the action of the net coupler (couplers 106 and 122 and the phase shift 126) is:

$$\frac{1}{\sqrt{2}}\begin{bmatrix} -1-3\Delta & j-3j\Delta \\ j-3j\Delta & -1-3\Delta \end{bmatrix}, \frac{-1+\sqrt{3}}{2\sqrt{2}}\begin{bmatrix} -1+\sqrt{3}\,j\Delta & j+\sqrt{3}\,\Delta \\ j-\sqrt{3}\,\Delta & -1-\sqrt{3}\,j\Delta \end{bmatrix}, \text{ and}$$

$$\frac{-1}{\sqrt{2}}\begin{bmatrix} -1+\Delta & j+j\Delta \\ j+j\Delta & -1+\Delta \end{bmatrix}$$

respectively, where j denotes a complex operator.

A phase shift of $\phi=0°$ gives the largest error in amplitude, since this results in a very long optical coupler. A phase shift of $\phi=120°$ also gives a large error in amplitude, but a zero error in magnitude. A phase shift of $\phi=120°$ is a preferred choice for the lens-coupled embodiment of the invention described below with respect to FIG. 2, since the error in phase from this coupler can be corrected post-fabrication by a second phase shifter. Finally, a phase shift of $\phi=180°$ results in the least error in amplitude and is thus the best choice for the present embodiment of the invention, where the 90° optical coupler 122 is directly coupled to the first free space region 118 of the second wavelength routing device 104.

The present invention thus provides a compact and stackable optical multiplexer/demultiplexer 100 having a substantially flat passband. Because the sign of curvature is flipped between the first and second wavelength routing devices 102 and 104, the present invention is stackable (i.e., multiple multiplexer/demultiplexer devices can be formed on a substrate). In addition, the present invention allows the second wavelength routing device 104 to have approximately 2N waveguide arms 110, where N is the number of wavelength channels in the free spectral range of the second wavelength routing device 104. Since the focal spot velocities versus wavelength change are matched at the interface between the first and second wavelength routing devices 102 and 104, the transmissivity spectrum of the optical multiplexer/demultiplexer 100 is substantially flat, substantially chromatic dispersion free, and substantially lossless across each passband.

Figure 2:
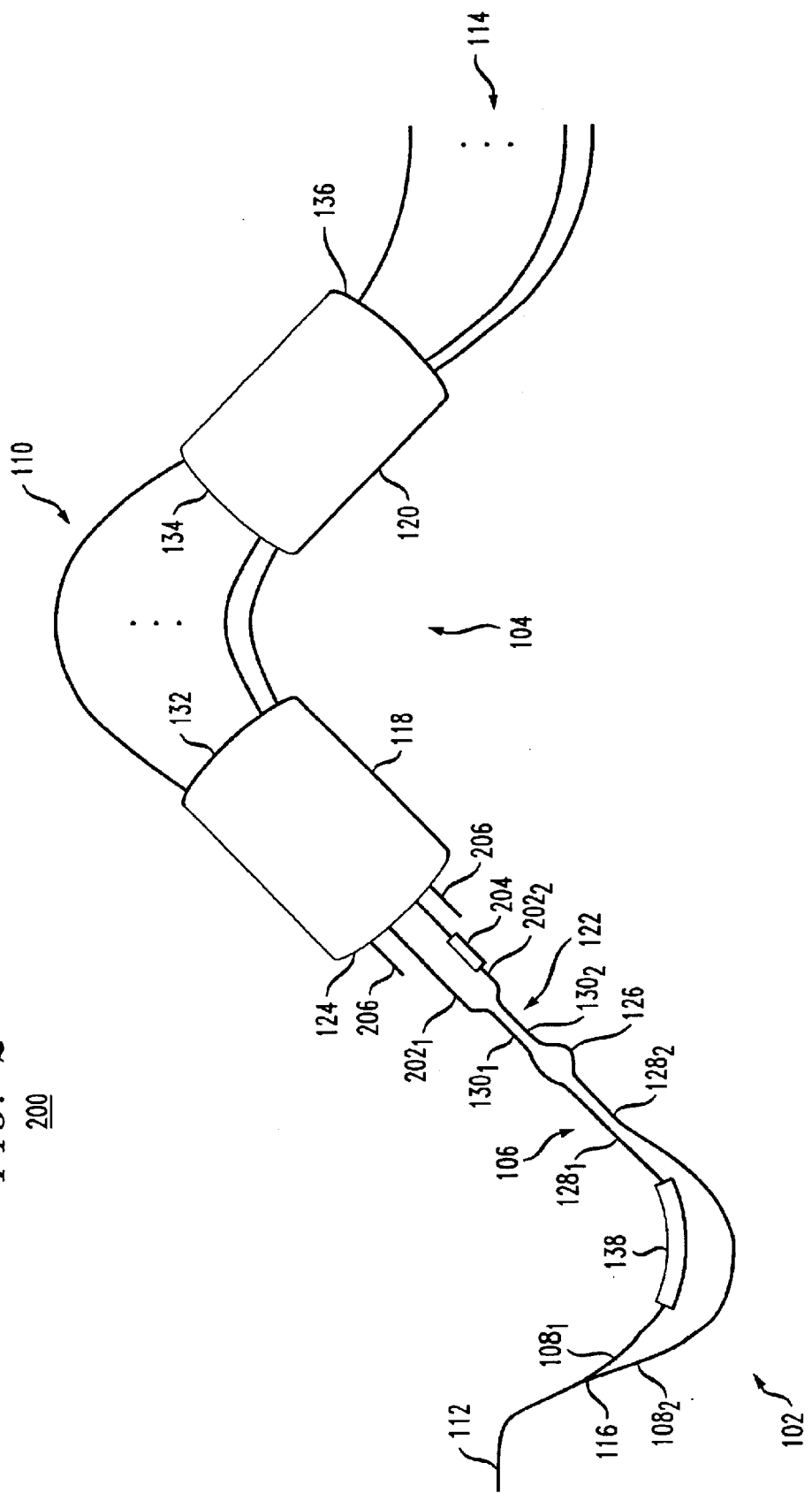
FIG. 2 depicts an alternative embodiment of the optical multiplexer/demultiplexer in accordance with the present invention.

FIG. 2 depicts an alternative embodiment of the optical multiplexer/demultiplexer 200 of the present invention. Elements of FIG. 2 that are similar to those depicted in FIG. 1 are designated with identical reference numerals and operate substantially as described above. In accordance with the second embodiment, the first wavelength routing device 102 is coupled to the second wavelength routing device 104 with two uncoupled waveguides $202_1$ and $202_2$ of substantially equal length. In particular, the two uncoupled waveguides $202_1$ and $202_2$ are coupled to the first free space region 118. A plurality of unconnected waveguides 206 are also coupled to the first free space region 118, where the waveguides 206 are adjacent to the uncoupled waveguides $202_1$ and $202_2$.

In addition, an optical phase shifter 204 is optionally disposed in one of the uncoupled waveguides $202_1$ and $202_2$. The optical phase shifter 204 is used to correct any phase error not compensated for by the phase shift 126. As described above, the phase shift φ produced by the optical phase shift 126 can be set to φ=120°, with any phase errors being corrected post-fabrication by the optical phase shifter 204. The optical phase shifter 204 comprises a thermooptic phase shifter, an electrooptic phase shifter, or like type optical phase shifters known in the art.

Although the various embodiments of the present invention have been described as performing a demultiplexing function, those skilled in the art will understand that the present invention can also perform the reciprocal function of multiplexing. As such, the various elements described above that were modified by the terms "input" and "output" are merely illustrative of the demultiplexing function. If performing a multiplexing function, the terms modified by "input" would be modified by "output" and vice versa. For example, the input waveguide 112 would become the output waveguide of a multiplexer.

Figure 3:
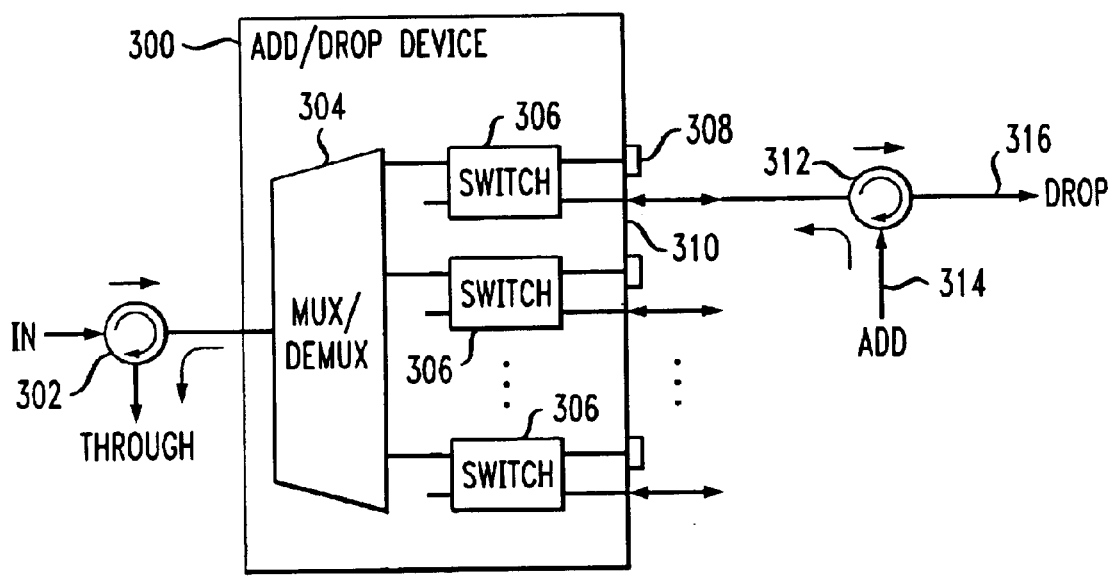
FIG. 3 depicts a block diagram showing an exemplary embodiment of an add/drop device employing the multiplexer/demultiplexer of the present invention.

FIG. 3 depicts a block diagram showing an exemplary embodiment of an add/drop device 300 in accordance with the present invention. The device 300 is coupled to a wavelength division multiplexed (WDM) network (not shown) via a circulator 302. The device 300 illustratively comprises an optical multiplexer/demultiplexer 304 and a switch 306 coupled to each demultiplexed port of the multiplexer/demultiplexer 304. In accordance with the present invention, the multiplexer/demultiplexer 304 is implemented as described above with respect to FIGS. 1 and 2. The switches 306 can be implemented as 1×2 Mach-Zehnder switches. Each Mach-Zehnder switch comprises two couplers connected by waveguides containing phase shifters.

Input channels pass through the circulator 302 and are demultiplexed, as a function of wavelength, by the multiplexer/demultiplexer 304. Each switch 306 routes a demultiplexed signal either to a mirror 308 or to an add/drop port 310. Signals routed to a mirror 308 are reflected back through a respective switch 306, back through the multiplexer/demultiplexer 304, and back out to the WDM network via the "through" port of the circulator 302.

The add/drop port 310 acts as a bidirectional port to add and drop data. An external circulator 312 coupled to the add/drop port 310 can provide separate add and drop ports 314 and 316, respectively. The add/drop device 300 is illustrative of the type of network element in which the present invention can be used. Those skilled in the art will appreciate that the optical multiplexer/demultiplexer device of the present invention can be used in other types of network elements in an optical transmission system, for example, transmitter and receiver network elements.

Figure 4:
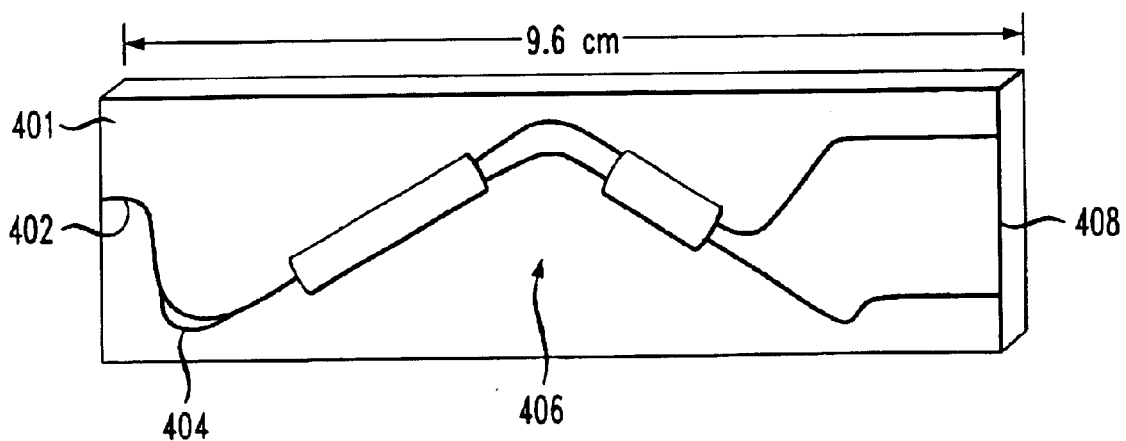
FIG. 4 depicts an exemplary embodiment of a 56-wavelength (or channel) multiplexer/demultiplexer device constructed in accordance with the present invention.

FIG. 4 depicts an exemplary embodiment of a 56-wavelength (or channel) multiplexer/demultiplexer device 400 in accordance with the present invention. The exemplary 56-wavelength device 400 has 100-GHz channel spacing and is formed on a substrate 401 as described above using silica waveguides. The device 400 comprises an input waveguide 402, a MZI 404, a WGR 406, and 56 output waveguides 408. The length of the device 400 is approximately 9.6 cm. The normalized index step is 0.65%, the substrate 401 is silicon, and a thermooptic phase shifter is used in one arm of the MZI 404 in order to wavelength-align the MZI 404 with the WGR 406. As described above, a misalignment between the MZI 404 and the WGR 406 results in a passband tilt.

Figure 5:
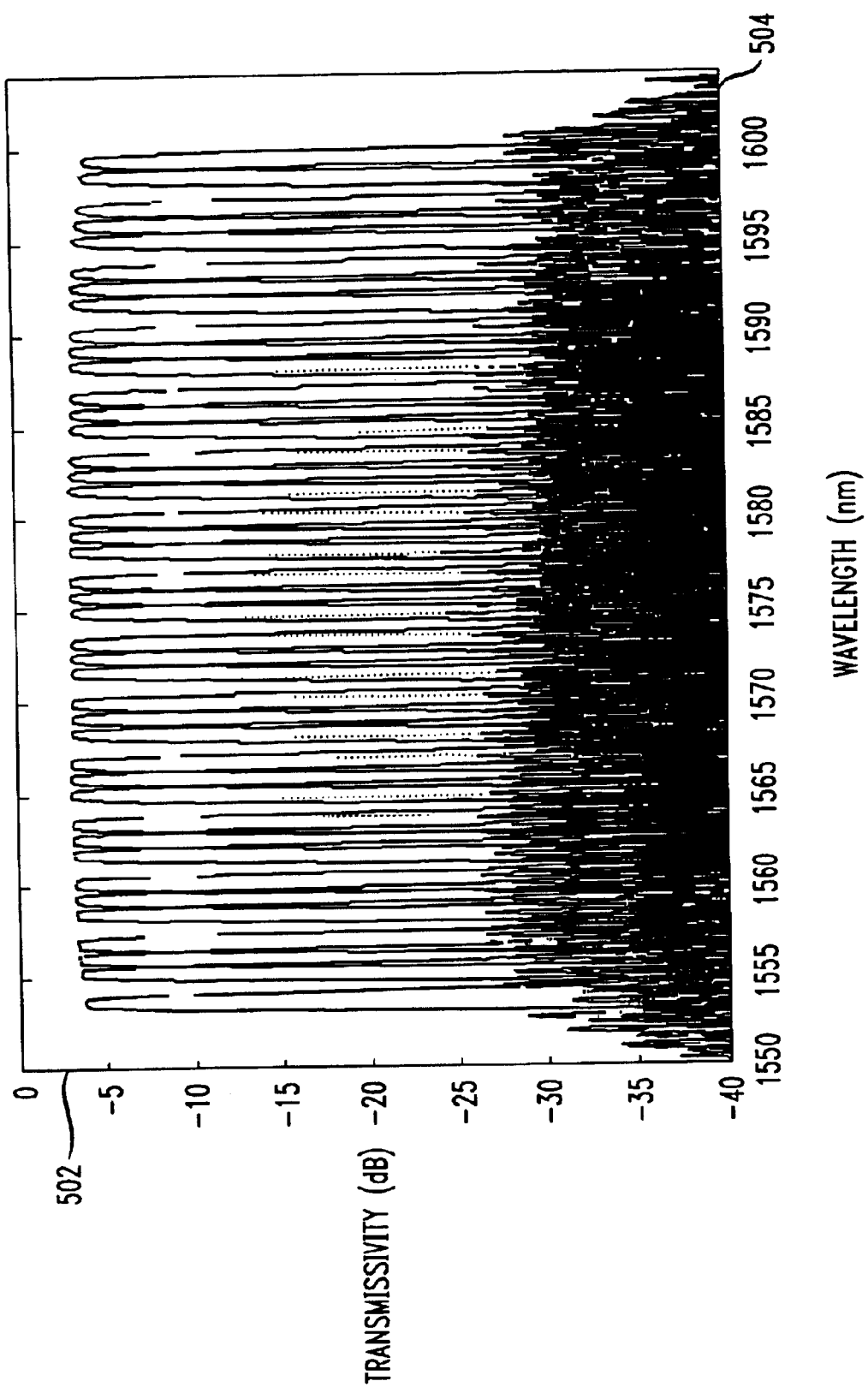
FIG. 5 graphically illustrates the fiber-to-fiber transmissivities for transverse-electrically polarized light for all 56 channels of the device of FIG. 4.
Figure 6:
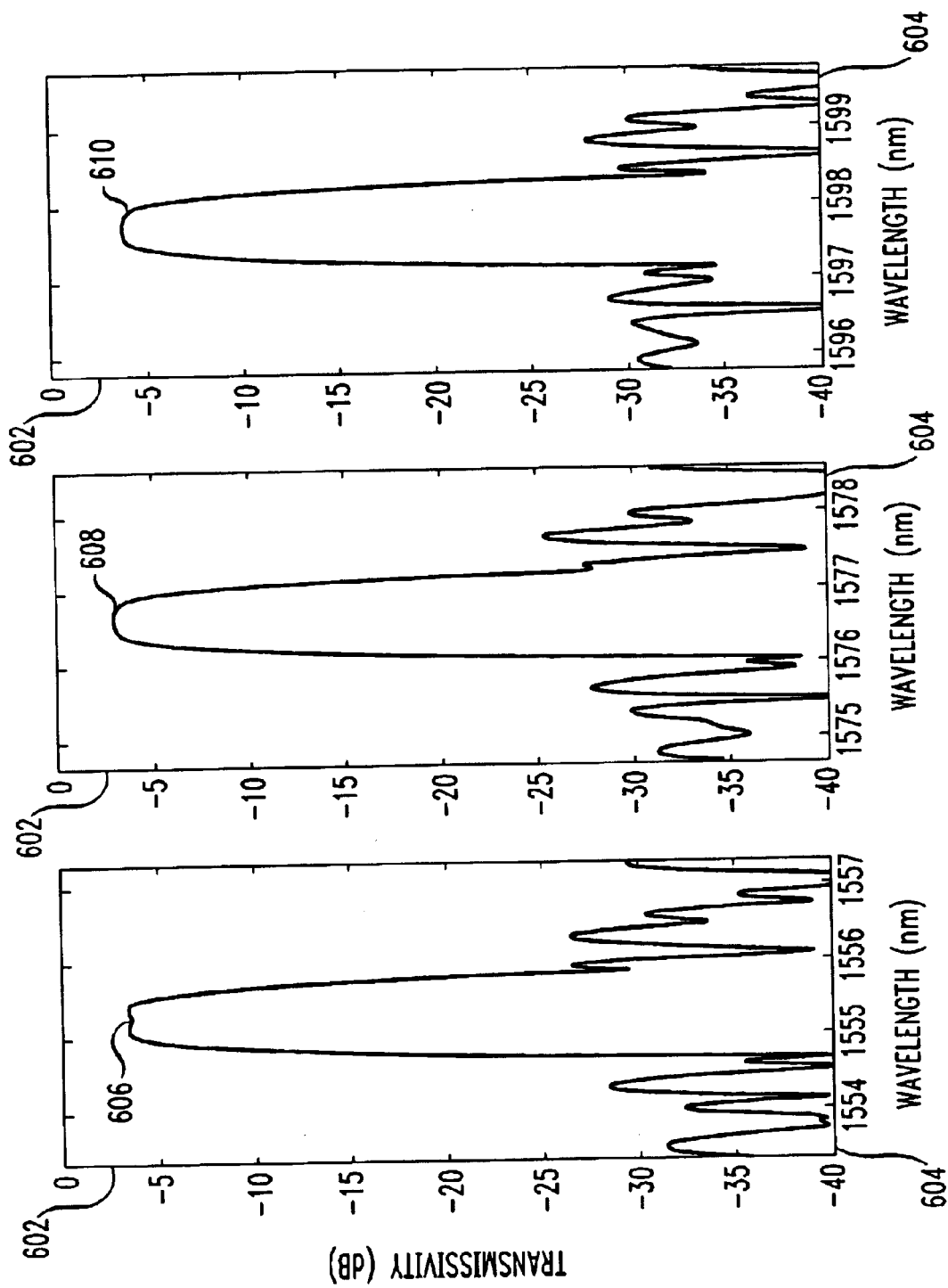
FIG. 6 depicts the details of the edge and center channels illustrated in FIG. 5.

In the present example, the WGR 406 comprises 195 waveguide arms, and the number of channels in the free spectral range of the WGR 406, N, is 76. The fiber-to-fiber transmissivities for transverse-electrically polarized light for all 56 channels are shown in FIG. 5, where axis 502 represents the transmissivity in dB, and axis 504 represents the wavelength in nm. FIG. 6 depicts the details of the edge channels 606 and 610, as well as a center channel 608, shown in FIG. 5, where axes 602 represent the transmissivity in dB, and axes 604 represent the wavelength in nm. All 56 channels have less than 4 dB fiber-to-fiber loss. All 56 channels have a 1-dB bandwidth greater than 70 GHz and a 20 dB bandwidth less than 140 GHz. Considering a bandwidth of ±25 GHz around each channel center, the total adjacent crosstalk is 19 dB, and the total non-adjacent crosstalk is 22 dB.

While the foregoing is directed to the preferred embodiment of the present invention, other and further embodiments of the invention may be devised without departing from the basic scope thereof, and the scope thereof is determined by the claims that follow.

What is claimed is:

1. An optical apparatus, comprising:
   a first wavelength routing device having a first plurality of waveguide arms and a 180° optical coupler; and
   a second wavelength routing device coupled to the first wavelength routing device, the second wavelength routing device having a second plurality of waveguide arms, each of the second plurality of waveguide arms having a substantially opposite curvature relative to each of the first plurality of waveguide arms.

2. The apparatus of claim 1, wherein the first wavelength routing device further comprises:
   an optical coupler for dividing an optical signal into a first signal and a second signal;
   first and second waveguide arms for guiding the first and second signals, respectively; and
   a 90° optical coupler disposed between the 180° optical coupler and the second wavelength routing device.

3. The apparatus of claim 2, wherein the 90° optical coupler is a directional coupler.

4. The apparatus of claim 2, wherein a path length difference between the first and second waveguide arms is substantially N times a path length difference between adjacent waveguide arms in the second frequency routing device, where N is the number of wavelength channels in the free spectral range of the second wavelength routing device.

5. The apparatus of claim 4, wherein the second wavelength routing device comprises approximately two times N waveguide arms.

6. The apparatus of claim 2, wherein the optical coupler is a Y-branch or a directional coupler.

7. The apparatus of claim 2, further comprising:
   an optical phase shifter disposed in the path of at least one of the first and second waveguide arms.

8. The apparatus of claim 7, wherein the optical phase shifter is a thermooptic phase shifter or an electrooptic phase shifter.

9. The apparatus of claim 2, wherein the first wavelength routing device further comprises:
   a second phase shift, disposed between the 180° optical coupler and the 90° optical coupler, for producing a predetermined phase shift in the optical signal.

10. The apparatus of claim 9, wherein the predetermined phase shift is approximately a 180° phase shift.

11. The apparatus of claim 1, further comprising:
    a pair of uncoupled waveguides coupled between the first wavelength routing device and the second wavelength routing device.

12. The apparatus of claim 11, further comprising:
a third optical phase shifter disposed in one of the pair of uncoupled waveguides.

13. A method, comprising:
(a) propagating an optical signal in a first plurality of waveguide arms and a 180° optical coupler of a first wavelength routing device; and
(b) propagating the optical signal in a second plurality of waveguide arms of a second wavelength routing device, each of the second plurality of waveguide arms having a substantially opposite curvature relative to each of the first plurality of waveguide arms.

14. The method of claim 13, wherein the step (a) further comprises:
dividing the optical signal into a first signal and a second signal;
guiding the first and second signals in first and second waveguide arms, respectively; and
guiding the first and second signals in a 90° optical coupler.

15. The method of claim 14, further comprising:
shifting the phase of at least one of the first and second signals propagating in the first and second waveguide arms, respectively.

16. In a network element of an optical transmission system, an optical multiplexer/demultiplexer apparatus, comprising:
a first waveguide for guiding an optical signal having a plurality of wavelengths;
a first wavelength routing device coupled to the first waveguide, the first wavelength routing device having a first plurality of waveguide arms and a 180° optical coupler;
a second wavelength routing device coupled to the first wavelength routing device, the second wavelength routing device having a second plurality of waveguide arms, each of the second plurality of waveguide arms having a substantially opposite curvature relative to each of the first plurality of waveguide arms; and
a plurality of waveguides coupled to the second wavelength routing device.

17. The apparatus of claim 16, wherein the first wavelength routing device further comprises:
an optical coupler for dividing an optical signal into a first signal and a second signal;
first and second waveguide arms for guiding the first and second signals, respectively; and
a 90° optical coupler disposed between the 180° optical coupler and the second wavelength routing device.

18. The apparatus of claim 17, wherein a path length difference between the first and second waveguide arms is substantially N times a path length difference between adjacent waveguide arms in the second wavelength routing device, where N is the number of wavelength channels in the free spectral range of the second wavelength routing device.

19. The apparatus of claim 18, wherein the second wavelength routing device comprises approximately two times N waveguide arms.

20. The apparatus of claim 17, wherein the first wavelength routing device further comprises:
a second phase shift, disposed between the 180° optical coupler and the 90° optical coupler, for producing a predetermined phase shift in the optical signal.

* * * * *